Inventor
J. L. Adcock 3,097,291
MEANS FOR DEPOSITING HARD METAL ON ANOTHER METAL BODY BY ELECTRIC SPARKS
John Lewis Adcock, Kenilworth, England, assignor to Wickman Limited, Coventry, England
Filed July 24, 1959, Ser. No. 829,276
3 Claims. (Cl. 219—76)

This invention relates to a method and means for depositing a hard metal such as sintered carbide, boride, nitride or silicide on a cutting or shaping tool or other metal body by electric sparks.

The object of the invention is to enable a uniform deposit to be formed in a simple and convenient manner.

The invention comprises a method wherein a condenser or condensers is or are discharged through a hard metal anode in contact with the workpiece, the discharge or discharges being controlled by an electronic switch or switches.

The invention also comprises means as hereinafter described for charging and discharging the condenser or condensers.

Figure 1:
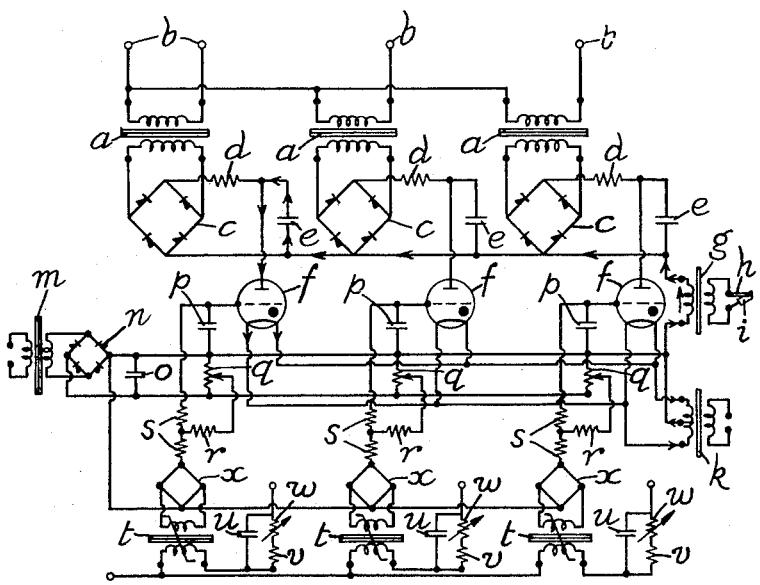
Figure 2:
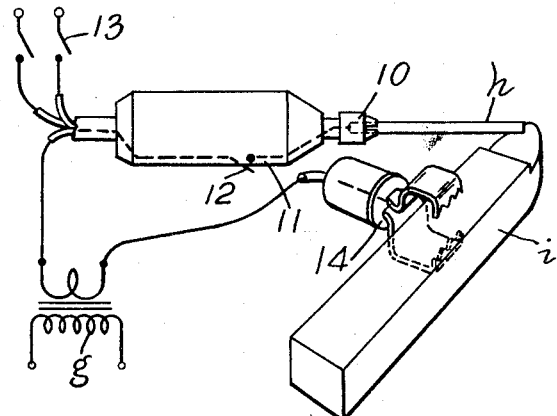

Referring to the accompanying drawings:

FIGURE 1 is a circuit diagram of one example of an apparatus in accordance with the invention for producing the required spark discharges from a 3-phase supply system, and FIGURE 2 illustrates a means for applying the discharges to a workpiece.

The apparatus in FIGURE 1 comprises alternating current transformers $a$ the primary windings of which are connected to the terminals $b$ of a supply system operating at, for example, 50 cycles per second. The ends of the secondary windings of the transformers $a$ are connected to full-wave bridge rectifiers $c$ which provide current for charging through resistances $d$ of one thousand ohms associated storage condensers $e$ of 2 microfarad capacity at, for example, 400 volts.

The condensers $e$ are arranged to discharge, as later described, through electronic switches consisting of thyratrons $f$ and the primary winding of a 7:1 step-down transformer $g$, the secondary winding of which is connected to terminals for connection to a sparking anode $h$ and a cathode workpiece $i$. The tool and workpiece are to be manipulated in mutual contact, and the switches $f$ enable the condensers $e$ to be cyclically charged to a uniform energy level notwithstanding the said contact.

The anode of each thyratron is connected to a point intermediate the associated charging resistance $d$ and condenser $e$, whereas the directly-heated cathode is connected to the ends of the secondary winding of a transformer $k$, the primary winding whereof is arranged for connection to an alternating current supply system of 50 cycles per second. The latter secondary winding is provided with a centre tapping which is connected to one end of the primary winding of the step-down transformer $g$, the other end having a return connection with the condensers $e$.

The control electrode or grid of each thyratron is influenced by a system for imposing thereon a negative bias voltage and by a pulse-forming network for rendering the thyratron conductive.

The said system includes an alternating current transformer $m$ for connection to ta current supply of 50 cycles per second. The secondary winding of this transformer applies a voltage of about 100 R.M.S. to a full-wave rectifier $n$ the output of which is stabilised by a condenser $o$ of about 2 microfarads capacity. The positive side of the condenser $o$ is connected to de-coupling condensers $p$ of .005 microfarad capacity the condensers being connected to the grids of the thyratrons. Thus a negative bias voltage is normally imposed on the grid. This voltage is adjustable by shunts across the condensers $p$ consisting of resistances $q$, $r$ and $s$ of 20 thousand, 100 thousand and 94 thousand ohms respectively, an adjustable contact on resistance $q$ being connected through resistance $r$ to the midpoint of resistance $s$.

A common line connects together the positive side of the rectifier $n$, the condensers $o$ and $p$ and the centre tapping on transformer $k$.

The pulse-forming network includes alternating current transformers $t$, each having a saturable core, for connection to one phase of a 3-phase current supply. One end of each of the primary windings is connected to a phase-shifting network consisting of a condenser $u$ of .22 microfarad capacity shunted by fixed and adjustable resistances $v$, $w$ of 10 thousand and 20 thousand ohms, respectively. The two ends of secondary winding are connected to a full-wave bridge rectifier $x$. Electrically positive pulses at a rate of 100 per second occur at the rectifier output terminal, and these are fed through the resistances $s$ to the thyratron grid. The contact on the resistance $q$ also enables adjustment to be made of the effect of the pulses applied to the grid.

Between the successive pulses from the pulse-forming network the voltage on the grids is such that the thyratrons $f$ are non-conductive and enable the condensers $e$ to be charged through the resistances $d$. The instant at which each pulse occurs is regulable by the adjustable resistance $w$. The effect of adjustment of the resistances $q$ is such that the pulses will render the voltages on the grids momentarily positive and the thyratrons conductive after the condensers $e$ have been charged to the desired level.

When the thyratrons become conductive, the condensers $e$ discharge through the thyratrons to the secondary winding of transformer $k$, and thence from the centre tapping and through the primary winding of transformer $g$ to the return connections of the condensers $e$. The discharges through the last-mentioned winding cause corresponding discharges between the sparking anode $h$ and workpiece, and this is accompanied by a transfer of the substance of the sparking anode to the workpiece $i$. This transfer of substance to the workpiece is related quantitatively to the energy discharged from condensers $e$, and the circuit arrangement described ensures that successive discharges are equal.

One convenient form of apparatus for applying the discharges to the workpiece is represented diagrammatically in FIGURE 2. The secondary winding of the transformer $g$ of FIGURE 1 is shown coupled to the sparking anode $h$ in the form of a rotary stick of hard metal and to a cathodic workpiece $i$, here shown as a metal cutting tool for use in a lathe. The anode $h$ is secured at one end in a chuck 10 on the end of a spindle of an electric motor within a casing 11 which is holdable by hand. A thumb-operable switch 12 in the connection between the secondary winding of the transformer $g$ and the anode $h$ is provided on the casing 11. The motor is driven by current from a supply system under the control of a switch 13. The workpiece $i$ to which connection is made by a clip 14, may be held in the hand or otherwise supported. During the application of the discharges from the anode $h$ this is held in light contact with the workpiece $i$ and rubbed over the part of the workpiece on which it is required to deposit a hard metal tip.

In the example above described the apparatus is supplied from a 3-phase system. But if desired an essentially equivalent apparatus may be used with a single-phase system, or with one phase of a 3-phase or one or each phase of any other polyphase system. Further, the invention is not limited to the particular arrangement of means above described, and instead of employing a thyratron as the electronic switch, an equivalent switch of the vacuum type triode valve, or a transistor may be used.

By this invention, a uniform and secure deposit of hard metal can be produce in a simple and convenient manner.

Having thus described my invention what I claim as new and desire to secure by Letters Patent is:

1. Apparatus for depositing sintered hard metal from a tool formed in part of said hard metal onto a workpiece, comprising in combination a first transformer having a primary winding and a secondary winding, the tool and workpiece being connected to opposite ends of the secondary winding respectively, a plurality of series circuits connected in parallel between opposite ends of said primary winding, each of said series circuits including a capacitor and an electronic switching device, a biasing circuit normally holding said electronic switching devices non-conductive, an A.C. source having a plurality of phases, a plurality of transformers and associated full wave rectifiers connecting the phases of the A.C. source to the plurality of capacitors respectively to charge the capacitors in turn in cyclic order, a switch-operating circuit operable by said A.C. source to render the electronic switching devices conductive in turn in cyclic order when the associated capacitors are charged to a predetermined level, each switching device serving when conductive to permit discharge of its associated capacitor through the primary winding of the first transformer, and said switch operating circuit ensuring that each capacitor discharges the same amount of energy through the primary winding of the first transformer irrespective of the positions of the tool and workpiece.

2. Apparatus for depositing sintered hard metal from a tool formed in part of said hard metal onto a workpiece, comprising in combination a first transformer having a primary winding and a secondary winding, the tool and workpiece being connected to opposite ends of the secondary winding respectively, a plurality of series circuits connected in parallel between opposite ends of said primary winding, each of said series circuits including a capacitor and the anode and cathode of a thyratron, a biasing circuit connected to the grids of the thyratrons for maintaining the thyratrons normally non-conductive, an A.C. source having a plurality of phases, a first set of transformers and associated full wave rectifiers connecting the phases of the A.C. source to the plurality of capacitors respectively to charge the capacitors in turn in cyclic order, a second set of transformers and associated full wave rectifiers connected between the phases of the A.C. source and the grids of the thyratrons respectively for supplying pulses to the grids to render the thyratrons conductive in cyclic order, and a plurality of phase-shifting networks associated with the second set of transformers and associated full wave rectifiers for delaying the application of pulses to the grids so that the capacitors are charged during the delays to the same level, each thyratron serving when conductive to permit discharge of its associated capacitor through the primary winding of the first transformer, and the phase-shifting networks ensuring that each capacitor discharges the same amount of energy through the primary winding of the first transformer irrespective of the positions of the tool and workpiece.

3. Apparatus as claimed in claim 2 including means for varying the delay imposed by each phase-shifting network.

References Cited in the file of this patent

UNITED STATES PATENTS

| | | |
|---|---|---|
| 2,235,385 | Rava | Mar. 18, 1941 |
| 2,394,535 | Dawson | Feb. 12, 1946 |
| 2,530,705 | Klemperer | Nov. 21, 1950 |
| 2,841,687 | Richter | July 1, 1958 |
| 2,876,330 | Reinhardt | Mar. 3, 1959 |
| 2,887,643 | Miyata | May 19, 1959 |
| 2,885,534 | Ter Berg et al. | May 5, 1959 |
| 2,891,209 | Schalk | June 16, 1959 |